US011083547B2

(12) United States Patent
Lopes

(10) Patent No.: US 11,083,547 B2
(45) Date of Patent: Aug. 10, 2021

(54) SELF-LIGATING BRACKET SYSTEM WITH PASSIVE OR INTERACTIVE CLIP

(71) Applicant: Alexandre Gallo Lopes, Ribeirão Preto (BR)

(72) Inventor: Alexandre Gallo Lopes, Ribeirão Preto (BR)

(*) Notice: Subject to any disclaimer, the term of this patent is extended or adjusted under 35 U.S.C. 154(b) by 0 days.

(21) Appl. No.: 15/288,812

(22) Filed: Oct. 7, 2016

(65) Prior Publication Data

US 2017/0100217 A1 Apr. 13, 2017

Related U.S. Application Data

(63) Continuation-in-part of application No. PCT/IB2015/051982, filed on Mar. 18, 2015.

(60) Provisional application No. 62/239,114, filed on Oct. 8, 2015.

(30) Foreign Application Priority Data

Jun. 6, 2014 (BR) .......................... 10 2014 013775

(51) Int. Cl.
*A61C 7/30* (2006.01)
*A61C 7/14* (2006.01)
*A61C 7/28* (2006.01)

(52) U.S. Cl.
CPC ................. *A61C 7/30* (2013.01); *A61C 7/14* (2013.01); *A61C 7/287* (2013.01); *A61C 2201/007* (2013.01)

(58) Field of Classification Search
CPC .. A61C 7/30; A61C 7/287; A61C 7/34; A61C 7/28; A61C 7/14; A61C 7/12; A61C 2201/007

USPC ...................................................... 433/8, 11
See application file for complete search history.

(56) References Cited

U.S. PATENT DOCUMENTS

| 4,023,274 A * | 5/1977 | Wallshein | A61C 7/30 433/11 |
| 4,260,375 A * | 4/1981 | Wallshein | A61C 7/30 433/11 |
| 6,168,428 B1 * | 1/2001 | Voudouris | A61C 7/285 433/11 |
| 6,190,166 B1 * | 2/2001 | Sasakura | A61C 7/12 433/11 |
| 9,615,899 B2 * | 4/2017 | Lopes | A61C 7/287 |
| 2006/0228664 A1 * | 10/2006 | Castner | A61C 7/287 433/11 |

(Continued)

FOREIGN PATENT DOCUMENTS

BR  MU8902352-8 U2  6/2011
BR  20 2012 002849-8 U2  3/2014

(Continued)

OTHER PUBLICATIONS

International Search Report of related International Patent Application No. PCT/IB2015/051982 dated Jun. 22, 2015.

*Primary Examiner* — Ralph A Lewis
(74) *Attorney, Agent, or Firm* — Arent Fox LLP

(57) ABSTRACT

A self-ligating orthodontic bracket system comprising a bracket body, an archwire, a slot receivable for an archwire, either a passive or interactive clip, and a channel capable of receiving the clip. The clip comprises two arms having a combined total width that is greater than the width of the channel.

16 Claims, 16 Drawing Sheets

(56) References Cited

U.S. PATENT DOCUMENTS

| | | | |
|---|---|---|---|
| 2007/0072143 A1* | 3/2007 | Sommer | A61C 7/285 |
| | | | 433/10 |
| 2010/0112508 A1* | 5/2010 | Lopes | A61C 7/287 |
| | | | 433/10 |
| 2011/0076633 A1 | 3/2011 | Bryant et al. | |
| 2011/0300501 A1* | 12/2011 | Antignano | A61C 7/12 |
| | | | 433/9 |
| 2012/0028206 A1* | 2/2012 | Lopes | A61C 7/287 |
| | | | 433/10 |
| 2012/0208143 A1* | 8/2012 | Zucchi | A61C 7/28 |
| | | | 433/11 |
| 2014/0272750 A1* | 9/2014 | Lai | A61C 7/287 |
| | | | 433/9 |
| 2015/0216629 A1* | 8/2015 | Voudouris | A61C 7/30 |
| | | | 433/9 |

FOREIGN PATENT DOCUMENTS

| | | |
|---|---|---|
| BR | 20 2012 003670-9 U2 | 5/2014 |
| EP | 1 723 927 A1 | 11/2006 |

* cited by examiner

SELF-LIGATING BRACKET SYSTEM WITH PASSIVE OR INTERACTIVE CLIP

CROSS-REFERENCE TO RELATED APPLICATIONS

This application is a Continuation-in-Part of International Application No. PCT/IB2015/051982, filed Mar. 18, 2015, which claims priority to Brazilian Application number BR 10 2014 013775 0, filed Jun. 6, 2014. This application also claims priority to U.S. Provisional Application No. 62/239,114, filed Oct. 8, 2015. The disclosures of the prior applications are hereby incorporated in their entirety by reference.

BACKGROUND

In conventional orthodontic brackets, an archwire applies corrective forces to a patient's teeth in order to move them to an ideal position. The archwire may be received in a slot in a bracket's body and secured within the slot's walls by an elastomeric or steel ligature tie applied to each tooth. However, this approach often results in repetitive and prolonged treatment.

Conversely, self-ligating brackets comprise a ligating member, such as a clip, for securing the archwire. One advantage of the self ligating bracket is a much lower friction at the slot-archwire interface. This approach allows the use of lower force archwires to move teeth, greatly reducing the iatrogenic potential of the treatment. Moreover, by eliminating elastomeric and ligature ties, the repetitive work and the time demanded to change the ligatures is drastically reduced.

However, self-ligating brackets generally have a greater buccolingual height, since they must be able to accommodate the sliding and locking mechanisms of the clip. This feature increases the bracket's overall size, often causing discomfort to the patient, as well as greater visibility, which can impair aesthetics and hygiene.

Another challenge for orthodontic professionals is determining and creating appropriate force systems for moving teeth according to the stage of a patient's treatment.

To create a force on the teeth, self-ligating brackets comprise a ligating member or clip over a slot, which is receivable for an archwire. When the ligating member or clip is open, the slot is exposed; closing the ligating member or clip retains the archwire within the slot.

Often, the ligature member or clip is a sliding ligating member capable of moving within sliding channels in the bracket's body. This approach allows the archwire to be reliably secured in a closed position with reduced operational time.

Self-ligating brackets may be passive or interactive. In passive brackets, clearance is provided between the four walls formed by the slot and the archwire. In an interactive bracket, progressively larger archwire-slot wall interaction is provided via use of a thicker archwire.

However, there is currently a need for new technologies for improving the clinical management and/or functionality of self-ligating brackets, as well as for reducing costs and expanding the base of users.

U.S. Pat. No. 7,621,743 relates to a bracket with a sliding clip that is guided by a lateral, slightly curved sliding channel. When the bracket is in the closed position, the clip is held in position by bilateral outward protuberances located in the arms of the clip, which correspond to two concave housings in the body of the bracket. However, the clip does not cover the entire mesial-distal width of the bracket slot, which hinders rotational control of the tooth. Additionally, the curved design of the channels increase the bracket's buccolingual height. Furthermore, the bracket does not allow both passive and interactive configurations in one system.

U.S. Pat. Nos. 5,322,435, 6,071,119, 6,776,613, and 7,335,020 also relate to self-ligating brackets. However, the brackets therein also do not allow both passive and interactive configurations in one system.

SUMMARY AND DETAILED DESCRIPTION

Aspects of the present invention provide for a self-ligating orthodontic bracket system which may be useful, for example, for correcting mandibulary and maxillary abnormalities, and/or for repositioning teeth. Aspects provide for an orthodontic bracket that may be used alone or in combination with other hardware systems to move teeth towards their ideal positioning in a patient's mouth.

According to aspects of the present invention, the self-ligating orthodontic bracket system may comprise a bracket body, an archwire, a slot receivable for an archwire, and either a passive or interactive clip. Aspects of the present invention may allow for both passive and interactive configurations in the same system. As used herein, the term "interactive" refers to a configuration wherein the clip is configured to interact with an archwire retained in an archwire slot, such that the archwire may not move freely. As used herein, the term "passive" refers to a configuration wherein the clip is configured to form a tube or other similar structure together with a slot, such that an archwire retained therein may move freely. The clips may not be removable from the bracket body and/or convertible between configurations.

According to some applications, aspects of the invention may be varied with respect to any of the features described herein in order to produce an appropriate force on the archwire, thereby producing distinct levels of resistance to archwire sliding in the slot. For example, the resistance to archwire sliding may correspond to greater or lesser interference at the archwire/slot and/or archwire/clip interfaces.

According to aspects of the present invention, the bracket body may comprise lower tie wings with channels therein receivable for the clip, and features and/or methods to move and lock the clip. According to aspects of the present invention, the clip may have a generally flat planar shape associated with passive clip or have radii or bends thereon, associated with an interactive clip. According to aspects of the present invention, the clip may also comprise arms with tabs thereon. The arms may extend over the slot, thereby retaining an archwire within the slot when the clip is in the closed position.

Figure 1:
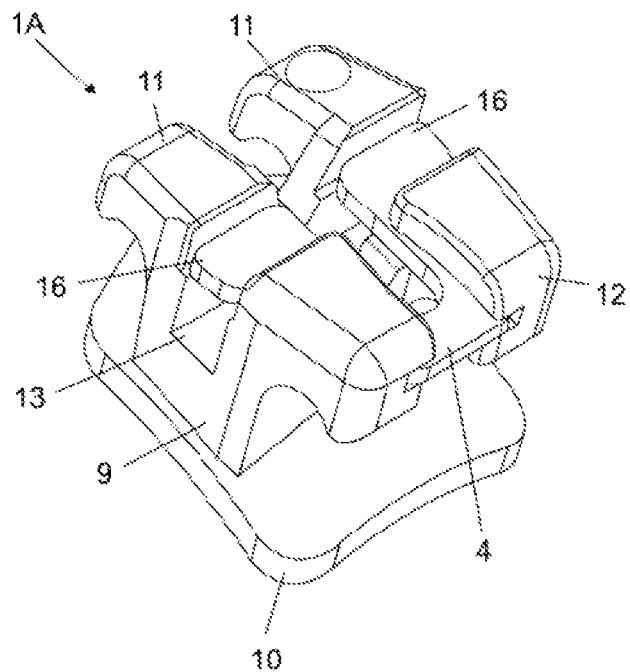
FIG. 1 shows an example of a self-ligating bracket system with a clip in a closed position, in accordance with aspects of the present invention.
Figure 2:
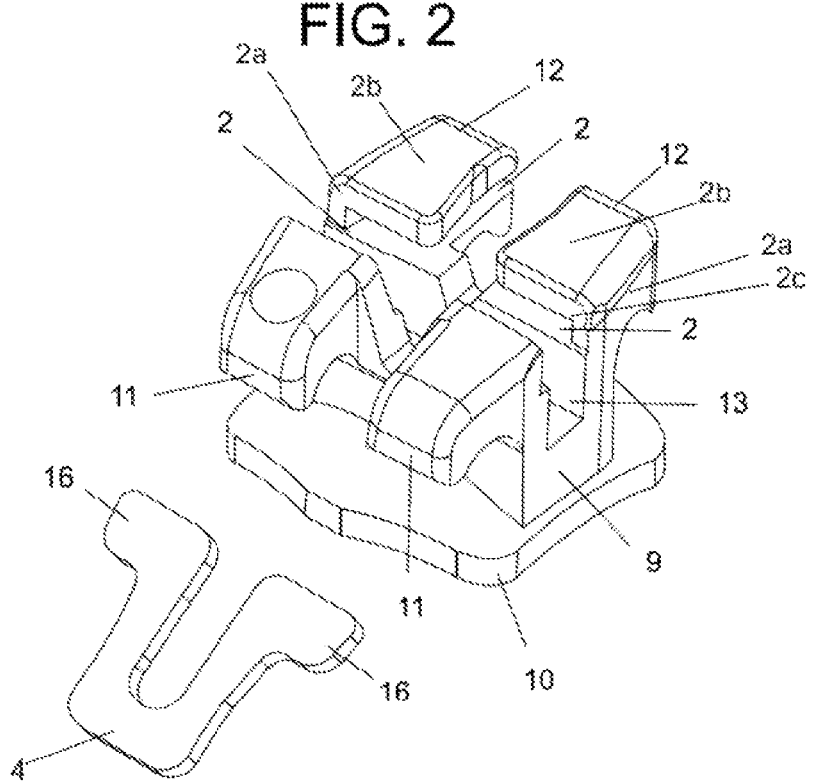
FIG. 2 shows an example of a perspective exploded view of a self-ligating bracket system in which the clip is removed from the system, in accordance with aspects of the present invention.
Figure 3:
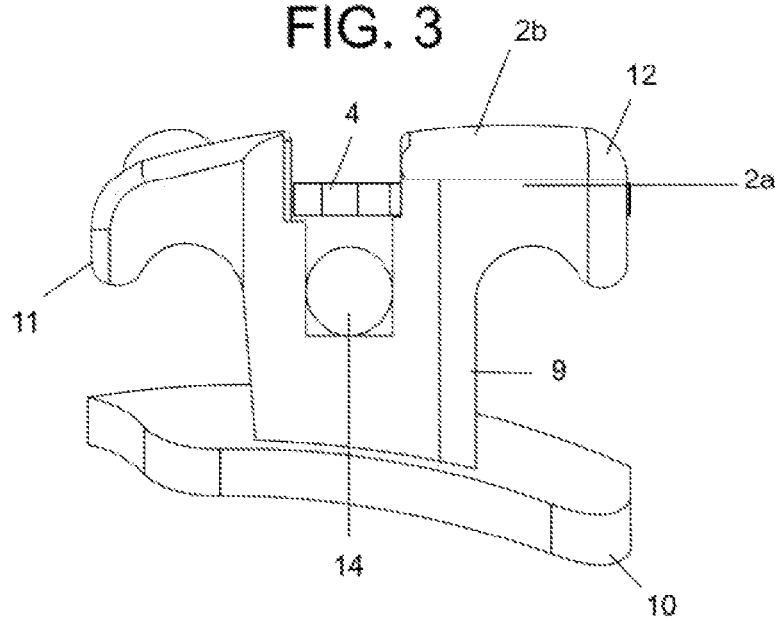
FIG. 3 shows an example of a lateral view of a bracket with the clip in a closed position and the archwire retained in the slot, in accordance with aspects of the present invention.
Figure 4:
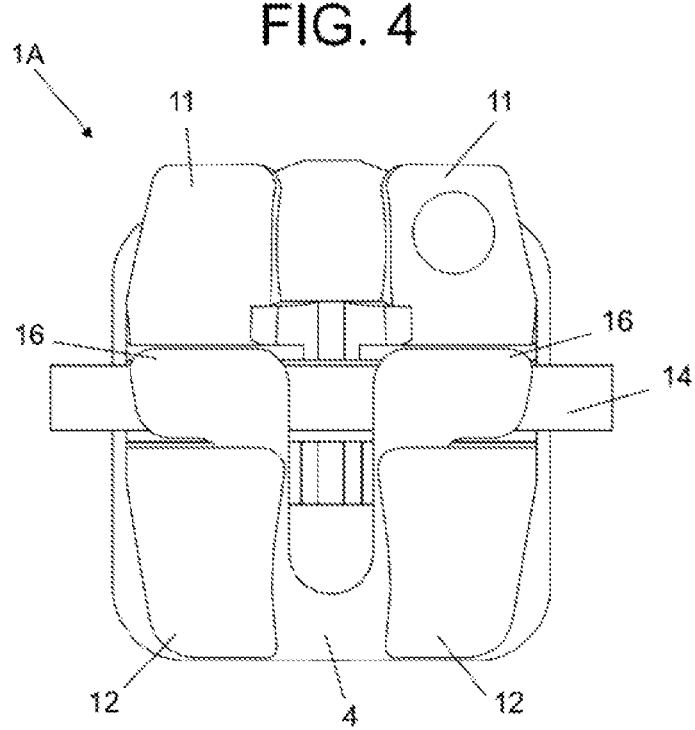
FIG. 4 shows an example of a self-ligating bracket system with the clip in a closed position retaining the archwire within the slot, in accordance with aspects of the present invention.

According to aspects of the present invention, as shown in FIG. 1, the self-ligating bracket system may comprise a bracket with a low profile body (9) with a bonding base (10) for application on the crown anatomy of a tooth. For example, as shown in FIGS. 2 and 3, the system may comprise at least two upper tie wings (11) and at least two lower tie wings (12), the lower tie wings including channels (2) therein capable of receiving a planar clip (4). The channels (2) may comprise an outer wall (2a) approximately 90° perpendicular to the bottom (2c) of the channel (2). The upper walls (2b) of the channel (2) may be shaped such that the lower tie wings appear similar to a conventional bracket and are thus familiar to the professional. At least in this way, the bracket body provides a familiar visual reference for positioning the bracket on a tooth.

Figure 28A:
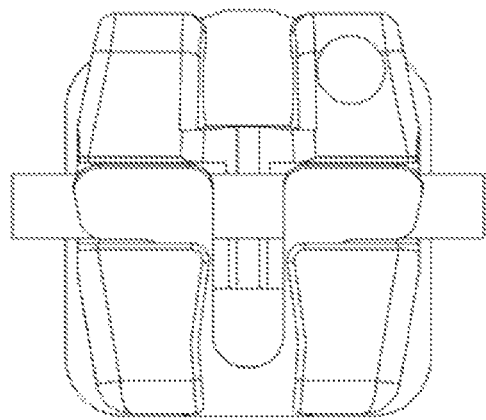
FIG. 28A shows an example of a self-ligating bracket system with a passive clip in a closed position retaining the archwire within the slot, in accordance with aspects of the present invention.
Figure 28B:
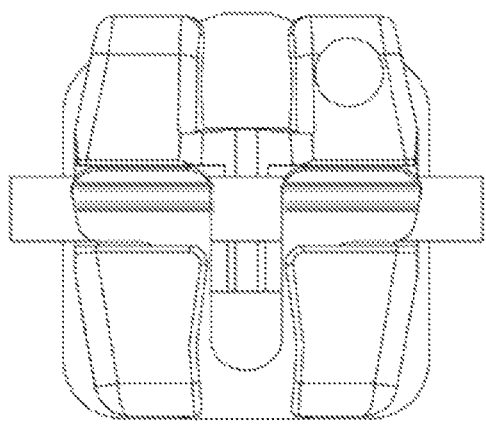
FIG. 28B shows an example of a self-ligating bracket system with an interactive clip in a closed position retaining the archwire within the slot, in accordance with aspects of the present invention.

The bracket may comprise a slot (13) receivable for an archwire (14) proximal to the upper tie wings and lower tie wings. According to some aspects, the archwire may be retained in the slot by a passive clip (4). As shown in FIGS. 9-19, the clip may be interactive and may comprise curved tabs (6). As shown in FIGS. 20-24, the clip may be interactive and comprise tabs located at the mesial distal extremities thereof, with approximately 90° bends (8). Depending on the configuration of the clip, the system may be passive (1A) or interactive (1B, 1C, and 1D) using similar or the same overall bracket construction or similar features, thereby providing a hybrid system. According to aspects of the present invention, the system may substantially retain a similar construction with a uniform buccolingual height, regardless of whether the clip is interactive or passive. For example, as shown in FIG. 28, the same or a similar bracket body construction may be used in conjunction with the passive and interactive clips. The only difference between FIG. 28(a) and FIG. 28(b) is the use of a passive and interactive clip, respectively. In some embodiments, this configuration may allow the selective use of passive and interactive brackets on individual teeth, e.g., by alternating passive and interactive brackets in a patient's mouth by selecting the appropriate clips.

Figure 5:
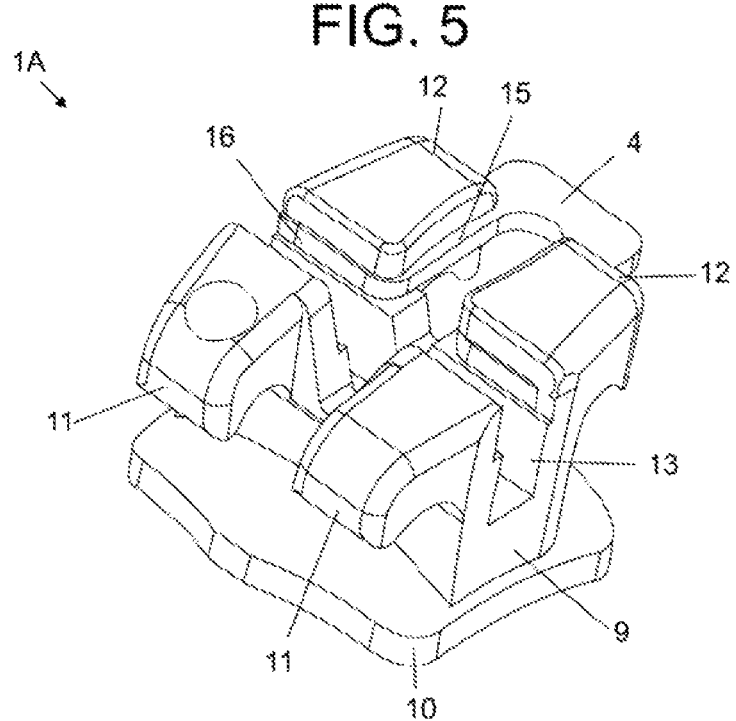
FIG. 5 shows an example of a perspective view of a self-ligating bracket system wherein the clip is in an open position exposing the slot, in accordance with aspects of the present invention.
Figure 6:
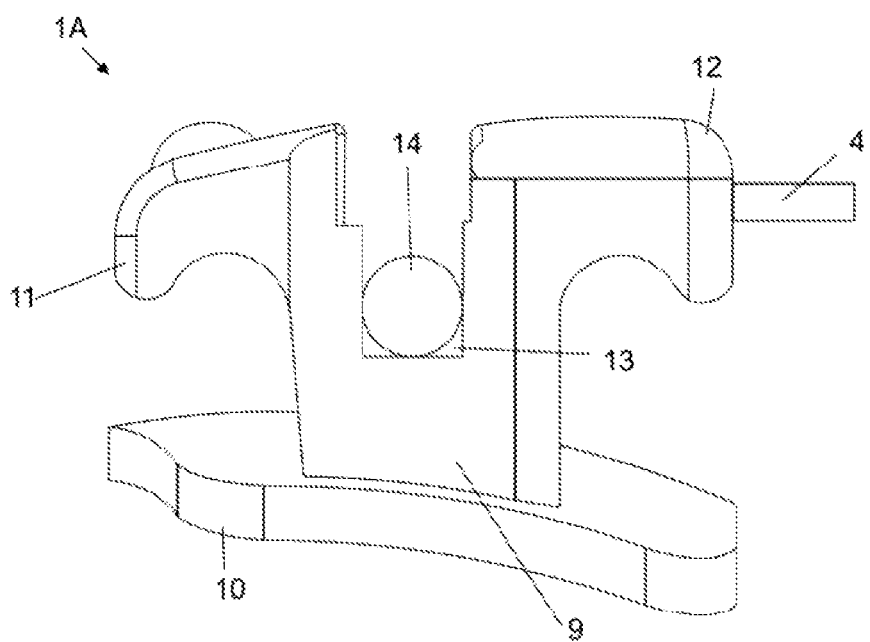
FIG. 6 shows an example of a lateral view of a self-ligating bracket system with a passive clip in the open, retracted position, exposing the slot to release the archwire, in accordance with aspects of the present invention.
Figure 7:
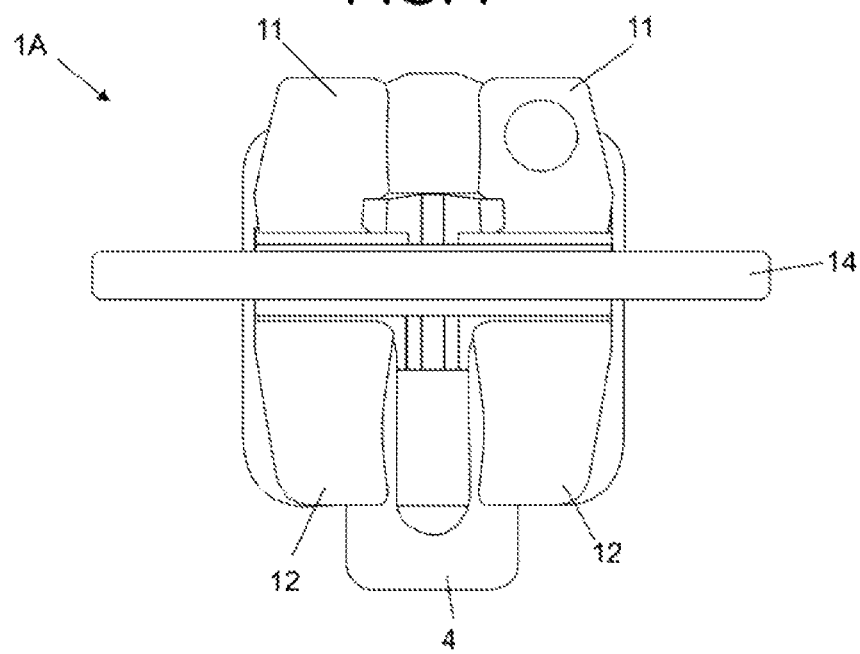
FIG. 7 shows an example of a self-ligating bracket system with a passive clip in an open position and locked to expose the slot in order to release the archwire, in accordance with aspects of the present invention.
Figure 8:
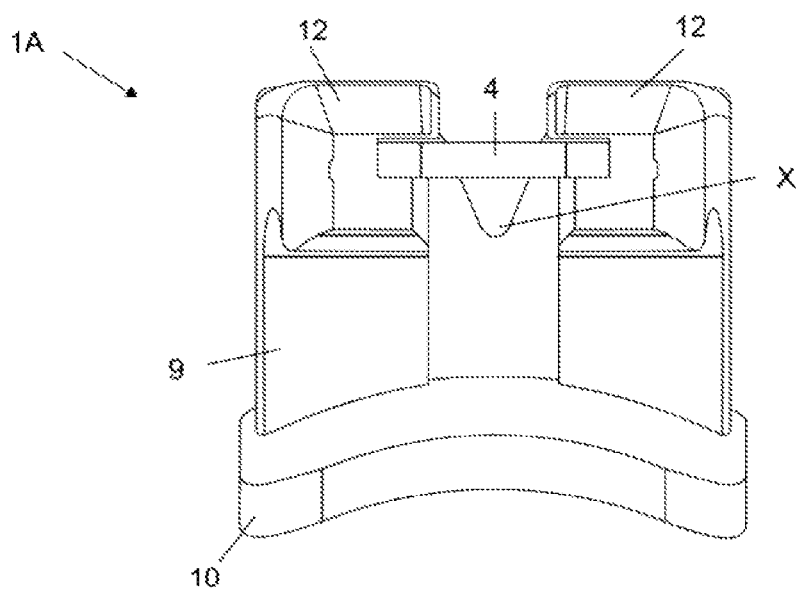
FIG. 8 shows an example view showing lower tie wings and a passive clip in closed position, in accordance with aspects of the present invention.

According to some aspects, as shown in FIG. 5, the clip (4) may comprise a generally "U" or a "V" cross-sectional shape, with arms (15) with planar tabs (16) at the ends thereof. The arms of the clip (4) may be of a sufficient width to extend to one or both ends of the mesial distal width of the slot (13) in the closed position, such that when the clip slides into each channel to the closed position, the clip together with the slot a tube-like or otherwise partially enclosing structure, such that an archwire retained therein may move freely therein when in a passive configuration.

According to some aspects, the clip may be manufactured in part or in whole using a shape memory alloy and a heat treating process that allows the clip to deflect in three Cartesian planes of space. The clip's flexibility in three planes of space may be useful, for example, when the clip moves in the channels towards the lower tie wings in the gingival/incisal direction from the closed to the open position. As seen in FIG. 25, the bracket may comprise a wall (25) perpendicular to the bottom wall of the channel. When moving toward the open position, the arms (24) may flex and converge towards the center (C) of the bracket, such as until the arms contact one another. This action of the arms may at least partly result from the total width of the arms being larger than the width of the channel in some variations. In this implementation, the clip is prevented from exiting the back of the channel, and is thus not removable from the bracket body.

Figure 26:
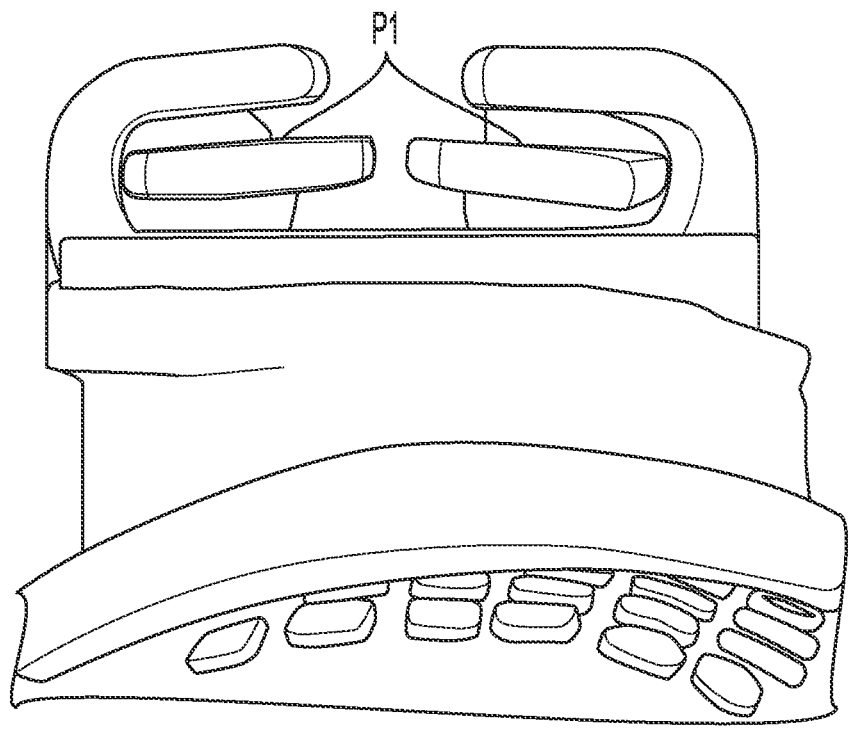
FIG. 26 shows a clip in the open position with the arms of the clip deflected upwardly and inwardly, in accordance with aspects of the present invention.
Figure 27:
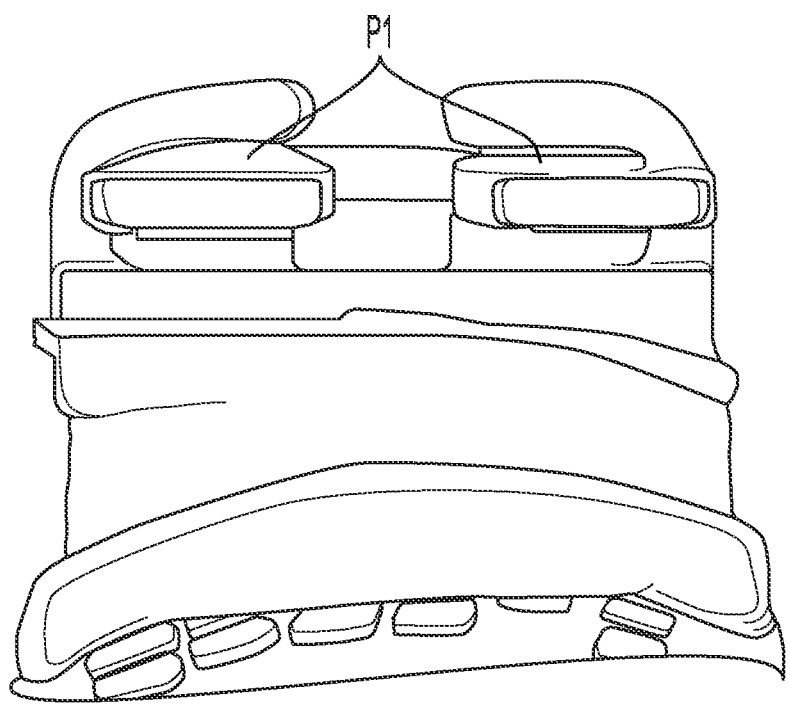
FIG. 27 shows a clip in the closed position with the arms of the clip parallel to the bottom of the slot, in accordance with aspects of the present invention.

For example, as shown in FIGS. 26 and 27, each arm may comprise an upper surface (P1). As shown in FIG. 26, the arms may be initially inserted into the channel (the position prior to full engagement of the arms also being interchangeably referred to herein as the "open position"). In this position, the arms may be flexed both upwardly and inwardly towards one another, such that the upper surface of each of the arms (P1) has a planar surface that is not completely parallel to the bottom planar surface of the slot. The clip may optionally be securely locked even when in the open position by interference of the arms with the top and/or side walls of the channel, without additional structures in or on the bracket body, channel, or clip being emplaced in order to hold the clip in place.

When moved to the fully engaged or "closed position" (i.e., when the arms are at least partially covering the slot), as shown in FIG. 27, the arms of the clip may return to their original configuration by shape memory. As seen in FIG. 27, the arms may thereby move downwardly and outwardly when traveling out of the channel and over the slot, such that the upper surfaces of each of the arms (P1) is approximately parallel in to the bottom planar surface of the slot upon reaching the closed position. Because the width of the arms is larger than the width of the channel, the clip will not reenter the channel after reaching the closed position without force being applied, such as by a user. For example, in the closed position, the clip may interface with a ridge on the vertical walls of the upper tie wings.

Figure 9:
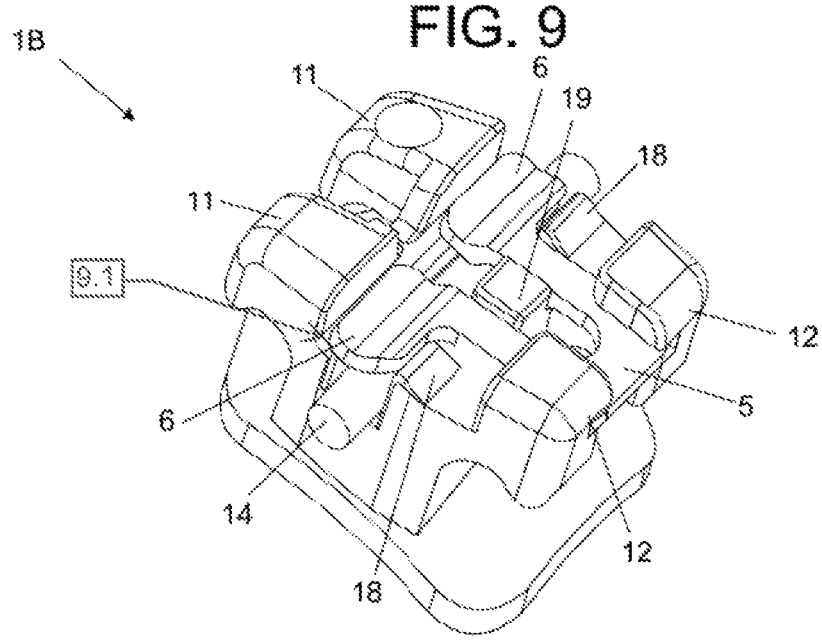
FIG. 9 shows an example of a self-ligating bracket system with an interactive clip in the closed position retaining the archwire within the slot, in accordance with aspects of the present invention.
Figure 10:
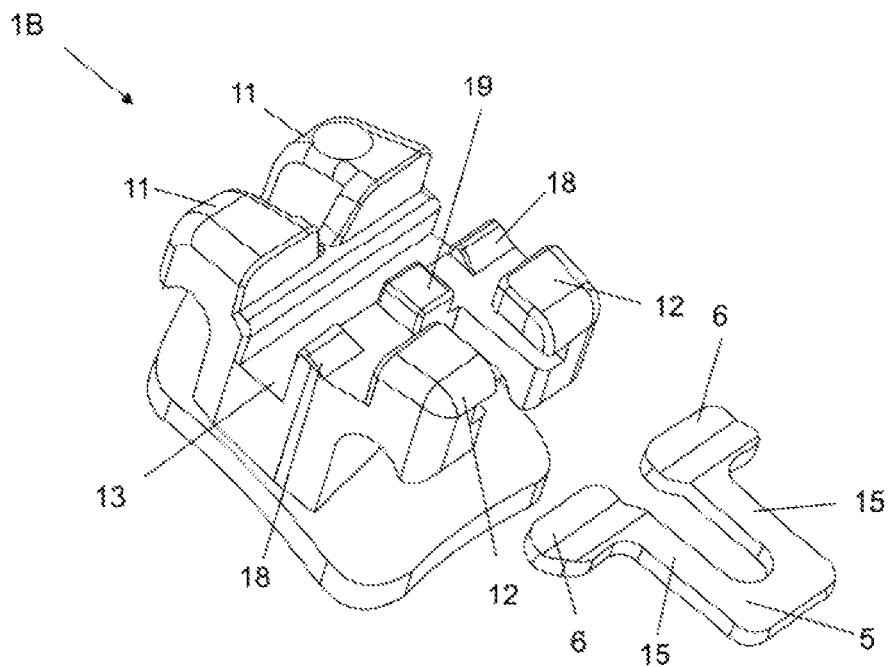
FIG. 10 shows an example of a self-ligating bracket system with an interactive clip removed from the system, in accordance with aspects of the present invention.
Figure 11:
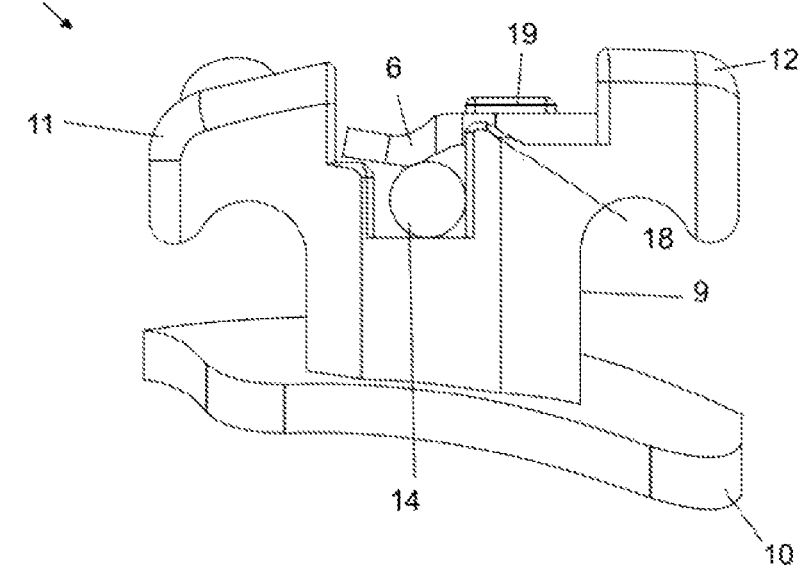
FIG. 11 shows an example of a self-ligating bracket system with an interactive clip in the closed position interacting with the archwire inside the slot, in accordance with aspects of the present invention.
Figure 12:
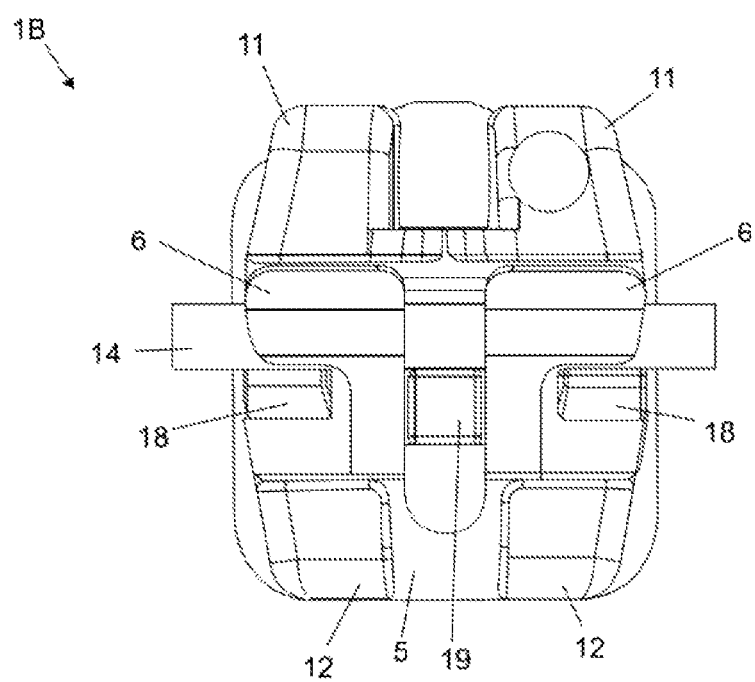
FIG. 12 shows an example of a self-ligating bracket system with an interactive clip in the closed position retaining the archwire inside the slot, in accordance with aspects of the present invention.

According to some aspects, as shown in FIG. 9, the bracket (1B) may comprise an interactive clip (5) with curved tabs (6) having a radius sufficient to establish contact with an archwire (14) received in the slot (13) when the clip (5) is in the closed position. The bracket may have one or more lateral protuberances (18) contiguous to a central protuberance (19), which may guide the clip (5) when moving between the open and closed position. The clip (5) have similar features of shape memory and temper described above, which may allow the deflection in three Cartesian planes, for example, when interfacing with the ridge on the vertical walls of the upper tie wings (11) when in the closed position and when traveling over the lateral protuberances (18).

Figure 14:
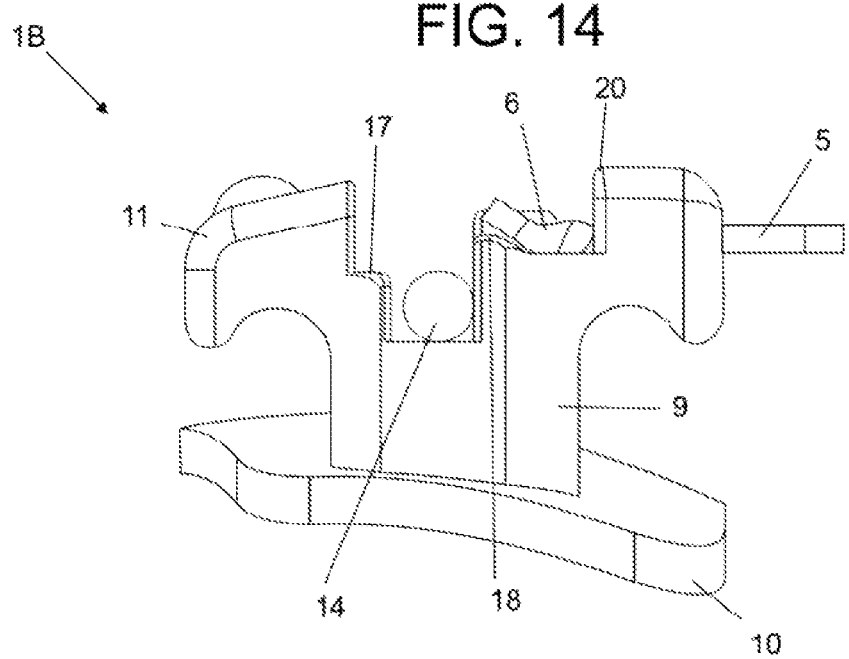
FIG. 14 shows an example of a self-ligating bracket system with an interactive clip with curved tabs in the open position, the clip being retracted and locked in the channel, and with the upper wall of the sliding channel in a retracted position, in accordance with aspects of the present invention.
Figure 15:
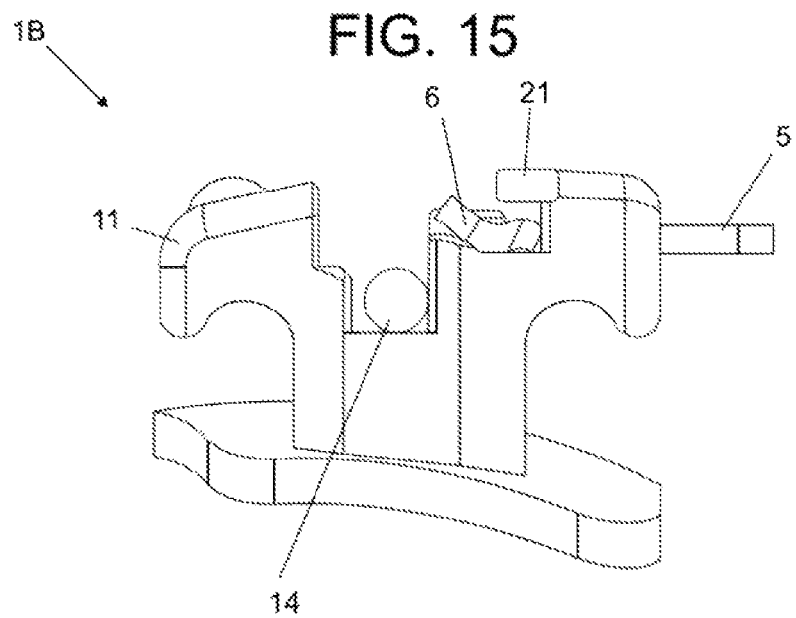
FIG. 15 shows an example of a self-ligating bracket system with an interactive clip with curved tabs in the open position, with the upper wall of the sliding channel in an intermediate position, in accordance with aspects of the present invention.
Figure 16:
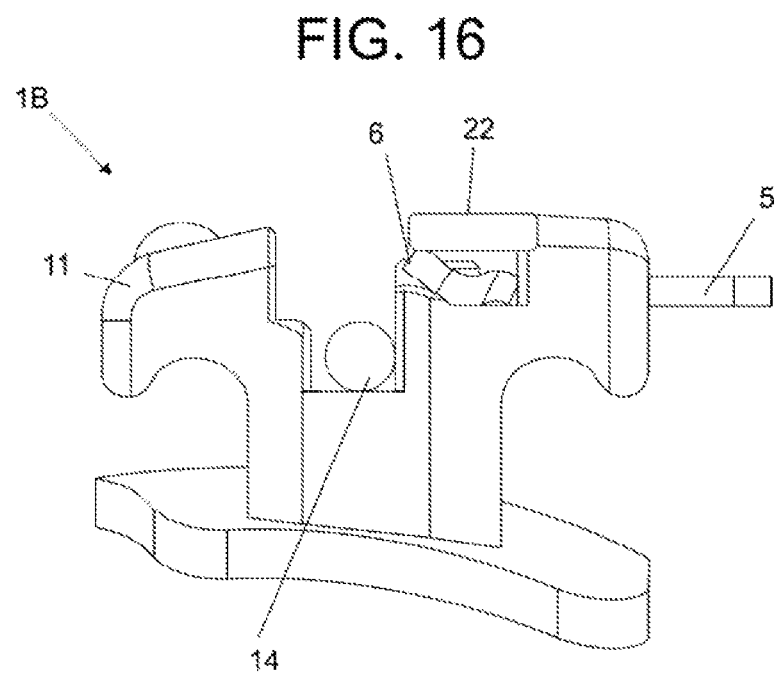
FIG. 16 shows an example of a self-ligating bracket system with an interactive clip with curved tabs in the open position, with the upper wall of the sliding channel in an advanced position and with the archwire inside the slot, in accordance with aspects of the present invention.
Figure 17:
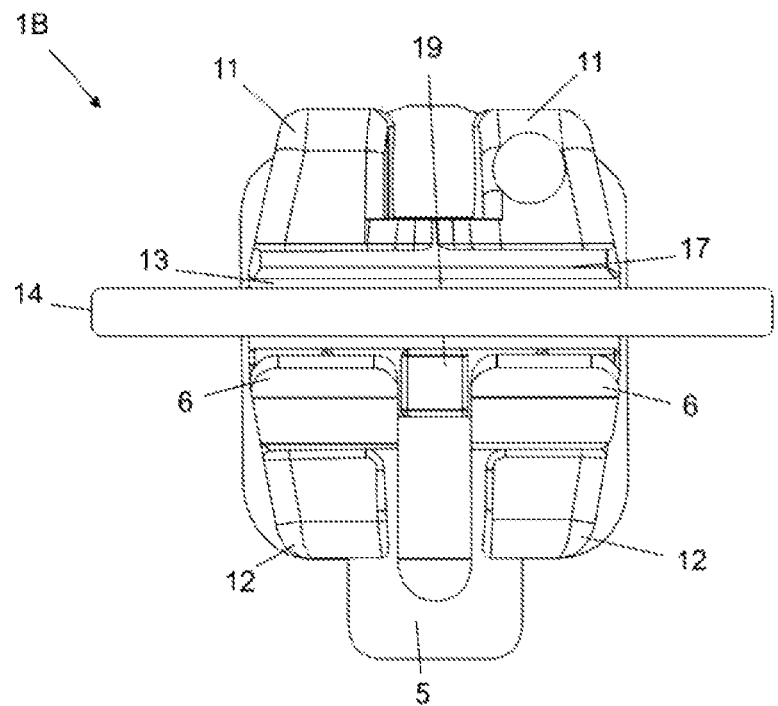
FIG. 17 shows an example of a self-ligating bracket system with an interactive clip with curved tabs in the open position exposing the slot in order to release the archwire, in accordance with aspects of the present invention.

According to some aspects, as shown in FIGS. 14-16, the upper wall (20, 21, and 22) of the lower tie wings, which form the channels, may have features selected so as to control the flexibility of the clip. For example, the upper wall (20) may be retracted in a first position, such that flexibility is at a maximum. The upper wall may be adjusted to an intermediate position (21) in order to create intermediate flexibility. The upper wall (22) may also be adjusted to the most advanced position (e.g., maximum extension towards the slot), such that the flexibility is at a minimum.

Figure 18:
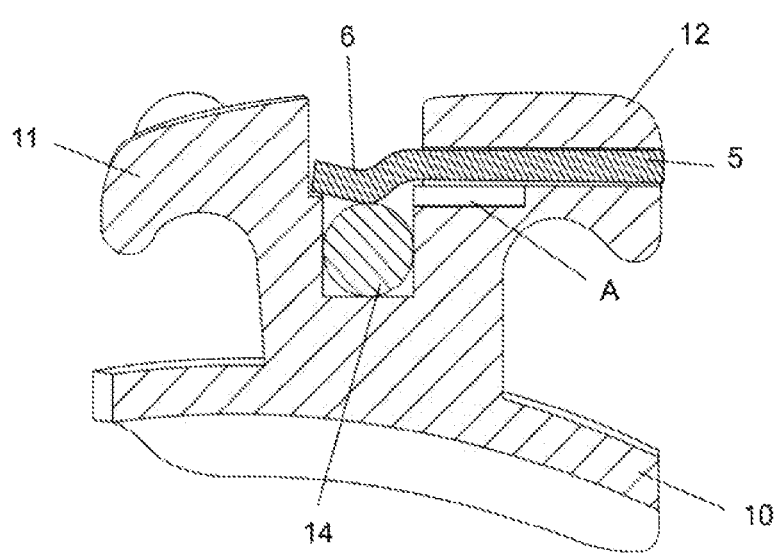
FIG. 18 shows an example of a self-ligating bracket system with an interactive clip with curved tabs in the closed position interacting with the archwire inside the slot, in accordance with aspects of the present invention.
Figure 19:
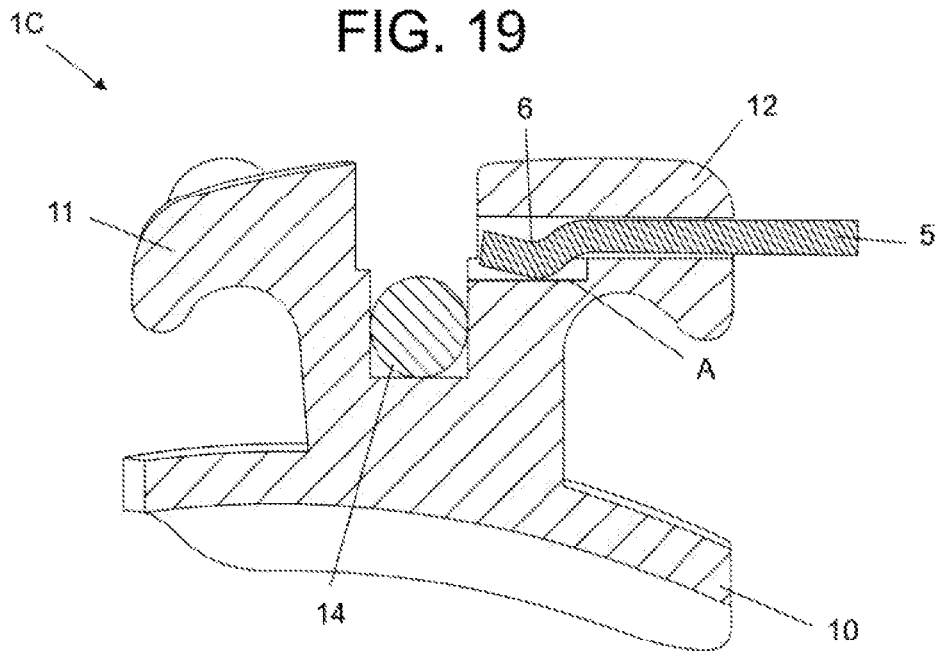
FIG. 19 shows an example of a self-ligating bracket system with an interactive clip with curved tabs in the open position, the clip being retracted and locked in the channel, in accordance with aspects of the present invention.
Figure 29A:
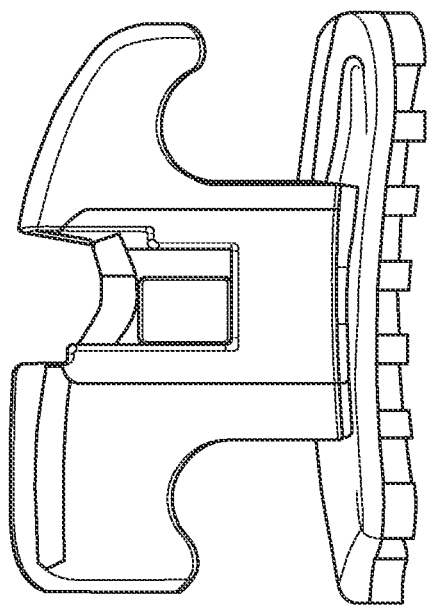
FIG. 29A shows an example of a medium resistance interactive clip, in accordance with aspects of the present invention.
Figure 29B:
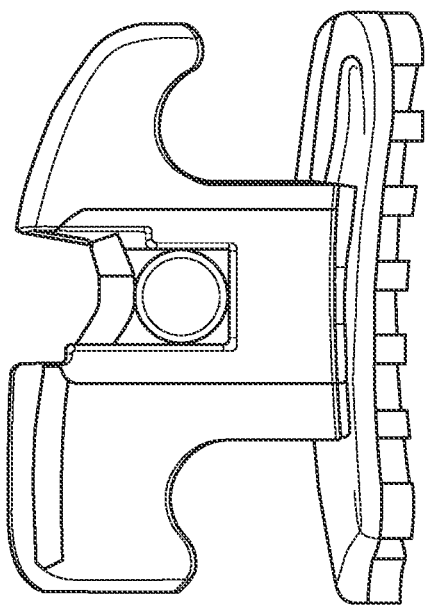
FIG. 29B shows an example of a high resistance interactive clip in accordance with aspects of the present invention.

According to some aspects, as shown in FIGS. 18-19, the bracket may comprise an interactive clip (5) with curved tabs (6). The body may comprise a recess (A) in the lower tie wings (12) for receiving for the curved tabs (6). As shown by FIGS. 29a and 29b, the performance of the interactive bracket with the curved tabs may be altered, for example, by increasing the radius of the tabs of the clip. In this way, the resistance to sliding that the clip provides on an archwire may be varied. In one example, as shown in FIG. 29a, a medium resistance interactive clip may be configured such that the clip may interact with an archwire having a height of about 0.022" or greater, for example. As shown in FIG. 29b, a high resistance interactive clip may be configured such that the clip may interact with an archwire with a height of about 0.018" or greater, for example. According to some variations, the pressure applied to an archwire may increase as the curvature of the tabs increases, as a larger curve will provide more pressure against the archwire toward the bottom of the slot According to some aspects, as shown in FIGS. 20-24, the bracket may comprise an interactive clip (7) with shape memory and temper as discussed above and with mesial/distal extremities of the tabs bent approximately 90° (8) towards the base of the body (9). The tabs (8) may dissipate excess force created at the interface of the clip (7) with the archwire (14) received in the slot (13), thereby increasing the system's resistance to archwire sliding, while repositioning the tooth. In this implementation, the body (9) may comprise recesses (23) on the lateral mesial and distal walls of the lower twin tie wings (12) configured to house a portion of clip (7) when it is in the open position.

In some aspects, the same bracket may be used with any suitable configuration of clip, thereby allowing a hybrid system having a combination of passive and interactive brackets. For example, it may be desirable to use interactive clips or a combination of interactive and passive clips during earlier phases of orthodontic treatment when lighter and/or smaller archwires are typically used. When heavier and/or larger archwires are used during later phases of treatment, it may be desirable to use passive clips.

According to aspects of the present invention, a planar clip may move in the channels of the lower tie wings, so that the clip may move from an open position to a closed position by moving toward upper tie wings in a direction parallel to the channels, until the arms and tabs of the clip extend to one or both ends of the slot. The total coverage of the slot by the clip may allow for better rotational control of the tooth, for example. In some aspects, the clip may be configured to be "self locking," such that it may be secured in the closed position without ramps, protuberances, ridges, recesses, or the like, in the upper or lower tie wings.

As shown in FIG. 9, in some aspects, the body of the bracket may comprise a supporting border ridge or similarly functioning feature (9.1) in the inner wall of the upper tie wings, which may support the clip tabs when in the closed position. In some variations, the body may have one or more protuberances (19) located between the lower tie wings, which may, for example, promote stability for the clip within the channels when moving between the closed and open position. For example, in some aspects, a protuberance located between the lower tie wings may stabilize the clip in the horizontal and vertical directions when the clip is travelling between the open to closed positions, wherein the clip could otherwise stray from an intended sliding path and thereby cause the clip to become stuck within the sliding channel.

Figure 13:
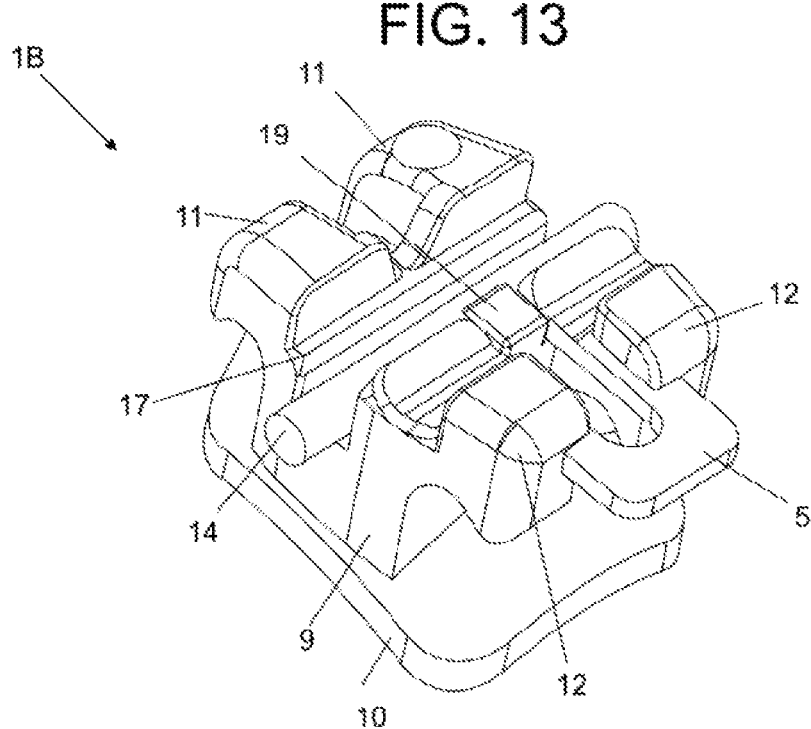
FIG. 13 shows an example of a self-ligating bracket system with an interactive clip in the open position, exposing the slot in order to release the archwire, in accordance with aspects of the present invention.

In some aspects, the body may have one or more lateral protuberances (18), which may serve as backstops for the clip and which may secure the clip in the open position by locking the clip in the open position. For example, in some aspects, as shown in FIG. 9, a lateral protuberance (18) may lock the clip in the closed position as the clip slides obliquely in a sliding plane over the lateral protuberance, and subsequently comes to rest in the closed position over the archwire slot. In the closed position, a posterior segment of the tabs (6) may be level with or below a vertical height, relative to the surface of a tooth, of the lateral protuberance. In this way, the lateral protuberance may at least partially lock the clip in the closed position and prevent the clip from sliding to the open position by masticatory forces or deflection of the archwire, for example. As shown in FIG. 13, in some aspects, when the clip is in the open position, a posterior area of the lateral protuberance may interact with an anterior portion of the tabs, thereby at least partially preventing the clip from involuntarily sliding to the closed position.

According to aspects of the present invention, the clip includes tabs having curvature. As shown in FIG. 19, the curvature may be in a direction generally perpendicular to the lengthwise direction of the arms of the clip and to the planar direction of the bottom of the slot. According to some aspects, the lower tie wings of the bracket body may include one or more concave portions (A) corresponding to the shape of the curved tabs, the concave portions being configured to house the curved tabs when the clips are located in the open position. As shown in FIG. 18, according to some variations, when the clip is in the closed position, the curved tabs may interact with an archwire retained in the slot in an interactive configuration.

Figure 20:
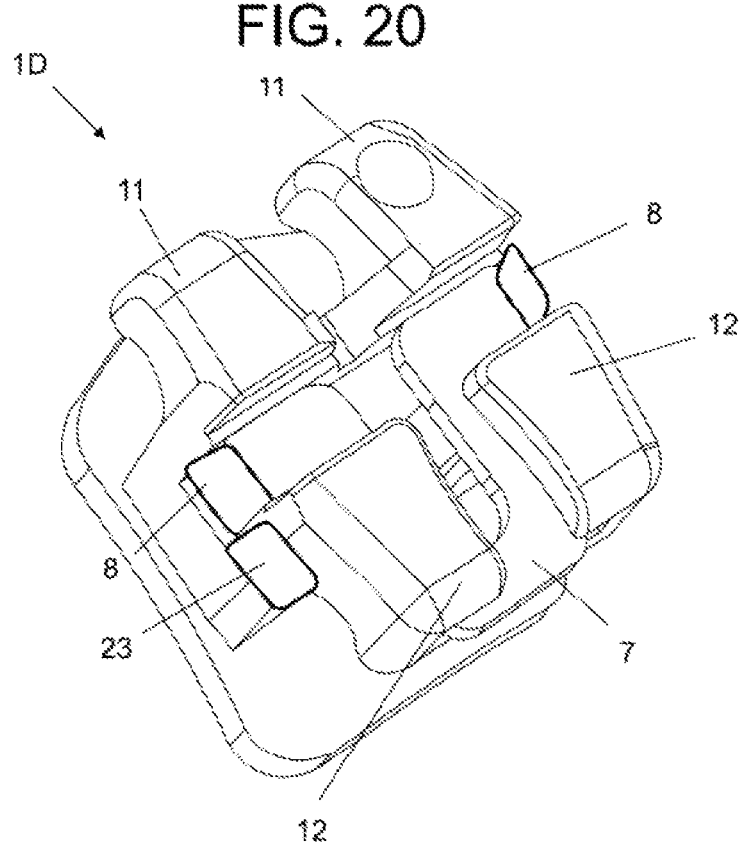
FIG. 20 shows an example of a self-ligating bracket system with an interactive clip with 90° bends in the closed position, in accordance with aspects of the present invention.
Figure 21:
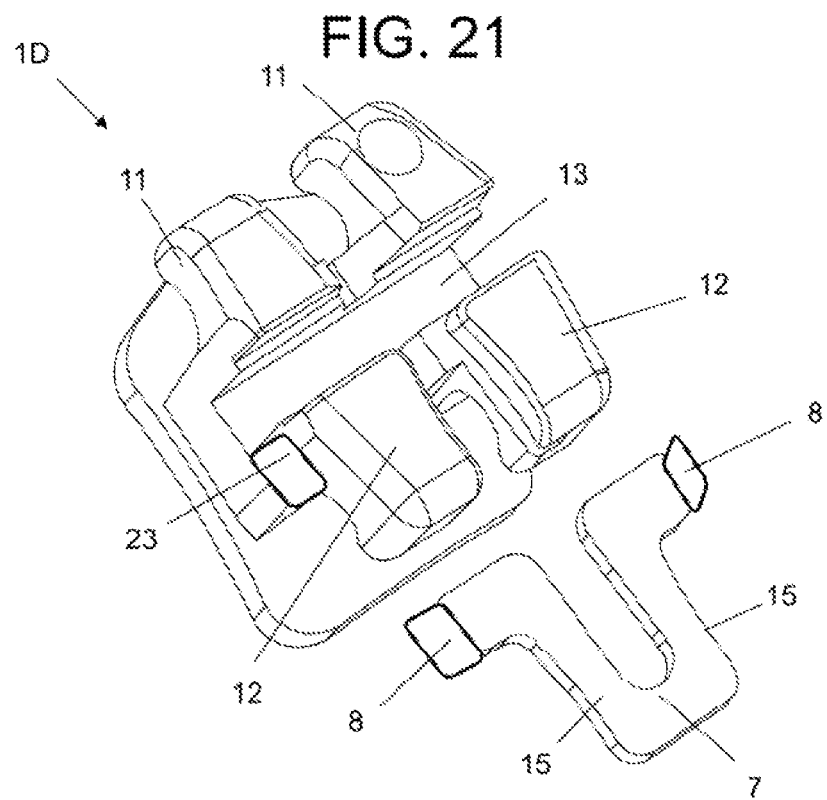
FIG. 21 shows an example of a self-ligating bracket system with an interactive clip with 90° bends, removed from the system, in accordance with aspects of the present invention.
Figure 22:
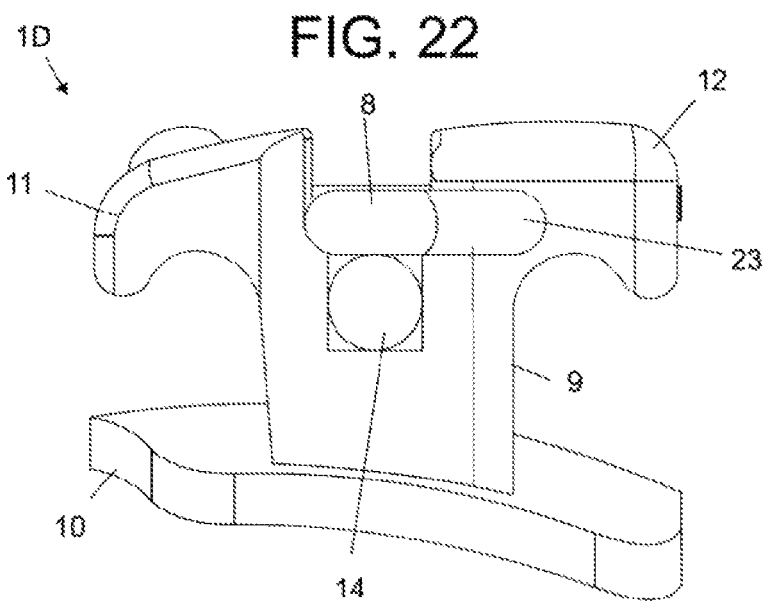
FIG. 22 shows an example of a ligating bracket system with an interactive clip with 90° bends in the closed position interacting with the archwire inside the slot, in accordance with aspects of the present invention.
Figure 23:
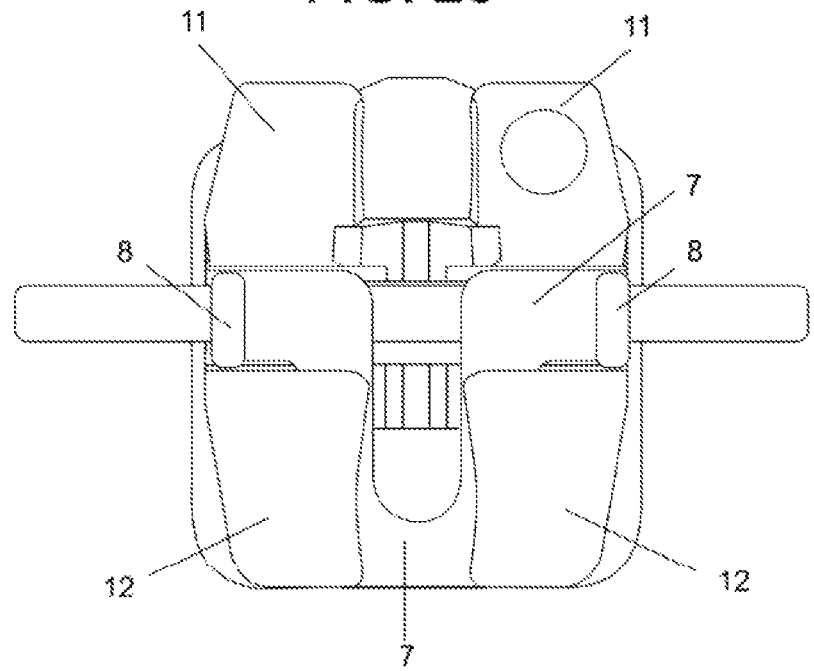
FIG. 23 shows an example of a self-ligating bracket system with an interactive clip with approximately 90° bends in the closed position interacting with the archwire inside the slot, in accordance with aspects of the present invention.
Figure 24:
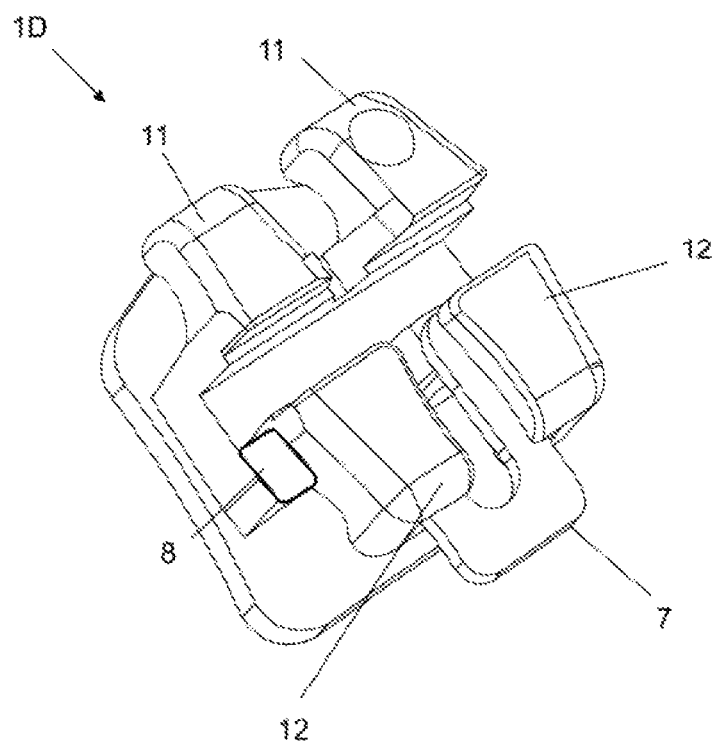
FIG. 24 shows an example of a self-ligating bracket system with an interactive clip with approximately 90° bends in the open position exposing the slot, in accordance with aspects of the present invention.
Figure 25A:
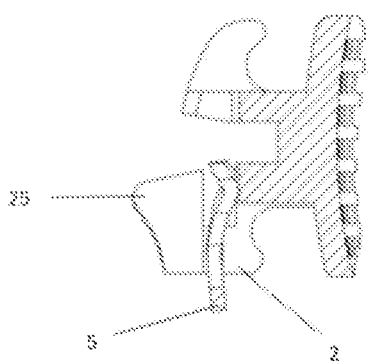
FIG. 25A shows an example of a self-ligating bracket system with an interactive clip in the open position, in accordance with aspects of the present invention.
Figure 25B:
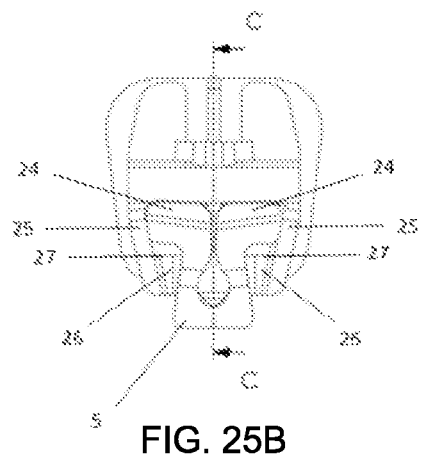
FIG. 25B shows an example of a self-ligating bracket system with an interactive clip in the open position with the clip's arms in contact with one another, in accordance with aspects of the present invention.
Figure 25C:
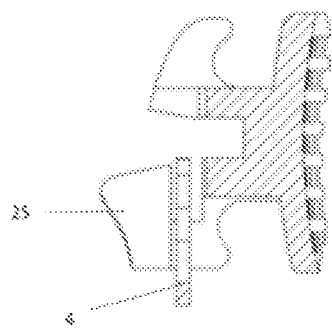
FIG. 25C shows an example of a self-ligating bracket system with a passive clip in the open position, in accordance with aspects of the present invention.
Figure 25D:
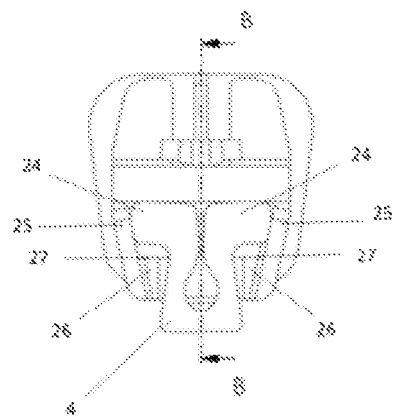
FIG. 25D shows an example of a self-ligating bracket system with a passive clip in the open position with the clip's arms in contact with one another, in accordance with aspects of the present invention.

As shown in FIG. 20, according to aspects of the present invention, the clip may comprise tabs that extend towards the bottom of the slot, thereby allowing interactive interaction with the archwire. According to aspects of the present invention, the tabs of the clip may be bent approximately 90° in the direction towards the bottom of the slot when in the assembled position. According to some aspects, the approximately 90° bent tabs may vary in vertical length. According to some aspects, the tabs may comprise a vertical length of between about 0.02 mm and 0.5 mm. According to some aspects, a bent tab with a larger vertical length may provide greater interference at the slot/archwire interface than tabs with a shorter vertical length, thereby providing more force on a retained archwire. According to some aspects, the bracket body may have a recess configured to house the tabs when the clip is in the open position. For example, according to some aspects, a recess (23) may be configured to house approximately 90° bent clip tabs (8) as the clip travels between the closed and open positions. In the open position, the bent tabs (8) may be housed in the recesses (23), one on the mesial and the other on the distal side of the bracket body.

According to aspects of the present invention, the slots may have a height between approximately 0.018" and 0.022", for example, which may be varied.

Figure 30:
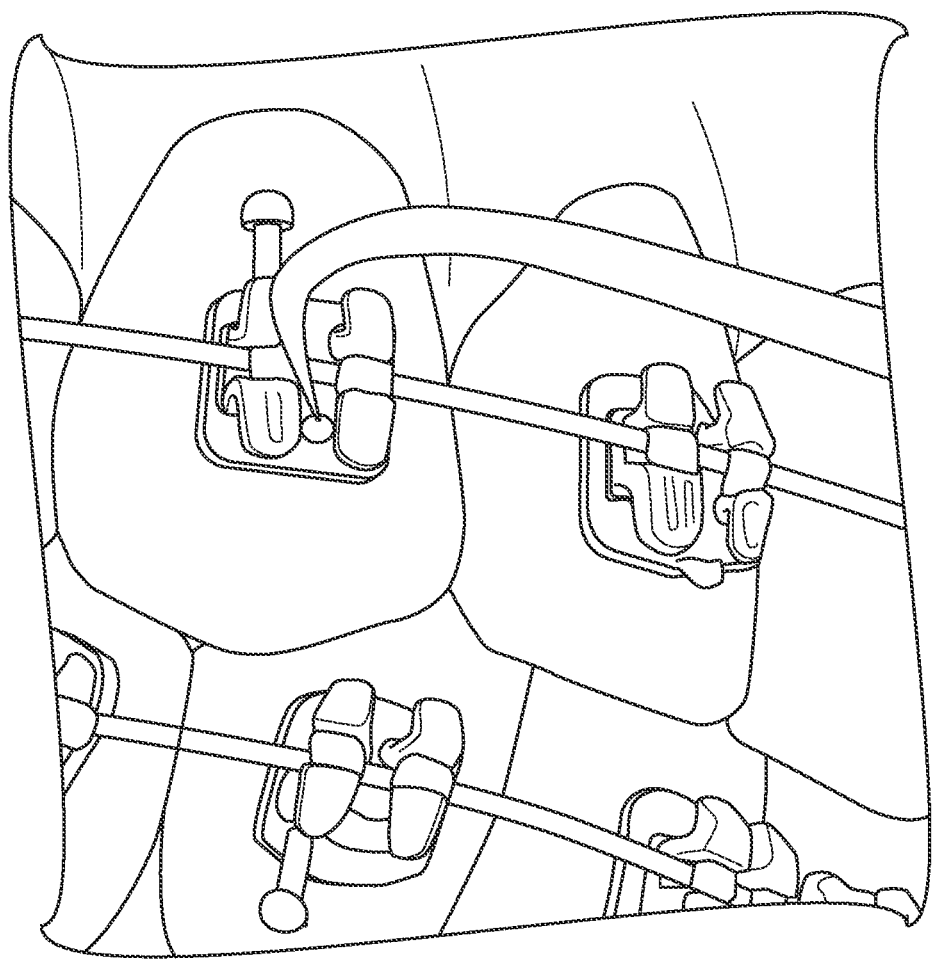
FIG. 30 shows an example of the tip of a dental instrument (for example, a scaler) placed between the arms of the clip, in accordance with aspects of the present invention.

According to aspects of the present invention, the clip may be moved between an open and closed position by placing a pointed instrument between the arms of the clip and creating a lever action toward the lower tie wings, so as to expose the slot. The clip may be moved to the closed position with a corresponding reverse movement. For example, according to some aspects, as shown in FIG. 30, the tip of a dental instrument (for example, a scaler) may be placed between the arms of the clip, into an opening formed by the clip and the bottom slot wall. The instrument may then be rolled toward the incisal (in the upper dental arch) and toward gingival (in lower dental arch) directions in order perform a lever action motion towards the lower tie wings, thereby at least partially moving the clip to the open position. According to some aspects, the lever action motion offsets forces making the opening motion more comfortable to the patient in comparison to pulling the clip down. Alternatively, the instrument may be pulled gently in the incisal (in the upper dental arch) or the gingival (in lower dental arch) direction in order to move the clip between the opened and closed position.

According to aspects of the present invention, the clip may comprise shape memory alloys. Examples of suitable shape memory alloys may include, but are not limited to, titanium and its alloys, NiTinol, CuNiTi, CoCr, heat treated stainless steel, and any other alloys that allow deflection in all planes of the space. The clip may have one or more mesial distal flexible arms comprised of shape memory alloys, which may deflect independently of one another according to the deflection of an archwire received in the slot over which the clip is located. According to some aspects, the flexibility of the arms of the clip may minimize the collateral effect of the force applied by the system, such that less force is necessary to prevent or minimize dental movement than what is necessary in systems comprising clips not accordance with the present invention. According to some aspects, the force applied by the clip on other components of the system may vary with the material composition, thickness, and heat treating processes of its manufacture.

According to aspects of the present invention, the buccal lingual height of the bracket may provide greater comfort to a patient than a bracket with a greater buccal lingual height. According to some aspects, the bracket may include one or more visual guides thereon, which may function as visual cues for placement on a tooth. The visual guides may be used in conjunction with an instrument for aligning the bracket with the tooth axis, for example.

Additional advantages and novel features relating to aspects of the present invention will be set forth in part in the description that follows, and in part will become more apparent to those skilled in the art upon examination of the following or upon learning by practice thereof.

What is claimed is:

1. A self-ligating bracket system comprising:
a bracket including a body, a bonding base, at least two upper tie wings, and at least two lower tie wings; and
a clip,
wherein the at least two upper tie wings and the at least two lower tie wings together form a slot for receiving an archwire,
wherein the at least two lower tie wings together comprise a channel therein capable of receiving the clip, the channel having a width being delineated by a first outer wall having a first planar surface and a second outer wall having a second planar surface,
wherein the clip comprises a first surface, the first surface extending in a planar direction and encompassing a first arm and a second arm, the first arm and the second arm having a combined total width that is greater than the width of the channel,
wherein the system has an open position and a closed position, wherein each of the first arm and the second arm have a surface extending in a plane parallel with the first surface when in the closed position, each of the first arm and second arm being unflexed in the closed position, and wherein the first arm and the second arm are received and locked in the channel in the open position with the first arm in contact with the first planar surface of the first outer wall and the second arm in contact with the second planar surface of the second outer wall such that the contact reversibly flexes each of the first arm and the second arm in a flexed direction toward one another such that the surface of the first arm and the surface of the second arm are rotated angularly such that the surface of the first arm and the surface of the second arm are non-parallel.

2. The self-ligating bracket system of claim 1, wherein the first arm is in contact with the second arm when the system is in the open position.

3. The self-ligating bracket system of claim 1, wherein in the closed position, the upper surface is parallel to a bottom planar surface of the slot, and wherein in the open position, at least a portion of the upper surface is not parallel to the bottom planar surface of the slot.

4. The self-ligating bracket system of claim 1, wherein the first and second arms are configured to extend toward one another as the clip moves from the closed position to the open position.

5. The self-ligating bracket system of claim 1, wherein the clip is interactive.

6. The self-ligating bracket system of claim 5, wherein each of the first and second arms comprises a curved tab configured to contact the archwire.

7. The self-ligating bracket system of claim 1, wherein the clip is passive.

8. The self-ligating bracket system of claim 1, wherein each of the first and second arms comprises a tab that extends in a direction perpendicular to the arm, each arm being configured to contact the archwire.

9. The self-ligating bracket system of claim 8, wherein each tab has a length in the direction perpendicular to the width of the channel of between 0.02 mm and 0.5 mm.

10. The self-ligating bracket system of claim 1, wherein the body comprises at least one protuberance proximal to the lower tie wings.

11. The self-ligating bracket system of claim 10, wherein the at least one protuberance comprises a guide protuberance configured to stabilize the clip as it moves between the closed position and the open position.

12. The self-ligating bracket system of claim 10, wherein the at least one protuberance comprises a lateral protuberance configured to secure the clip in the closed position or in the open position.

13. The self-ligating bracket system of claim 12, wherein the first arm and the second arm are received and locked in the channel in the open position when the lateral protuberance is configured to secure the clip in the open position.

14. The self-ligating bracket system of claim 1, wherein the at least two upper tie wings each comprise a supporting ridge configured to support the clip in the closed position.

15. The self-ligating bracket system of claim 14, wherein the shape memory alloy comprises one selected from the group consisting of titanium, NiTinol, CuNiTi, CoCr, and heat treated stainless steel.

16. The self-ligating bracket system of claim 1, wherein the clip comprises at least one shape memory alloy.

* * * * *

UNITED STATES PATENT AND TRADEMARK OFFICE
CERTIFICATE OF CORRECTION

PATENT NO. : 11,083,547 B2  
APPLICATION NO. : 15/288812  
DATED : August 10, 2021  
INVENTOR(S) : Alexandre Gallo Lopes Page 1 of 1

It is certified that error appears in the above-identified patent and that said Letters Patent is hereby corrected as shown below:

On the Title Page

Item [30], delete:
"Jun. 6, 2014 (BR) .......... 10 2014 013775"

And insert:
-- Jun. 6, 2014 (BR) .......... 10 2014 013775 0 --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*